United States Patent [19]

Linnig

[11] Patent Number: 4,619,587
[45] Date of Patent: Oct. 28, 1986

[54] COMPRESSOR DRIVE FOR AUTOMOBILE AIR CONDITIONING COMPRESSOR HAVING V-BELT VARIABLE DRIVE

[76] Inventor: Karl-Heinz Linnig, Dornierstrasse 33, D-7990 Friedrichshafen, Fed. Rep. of Germany

[21] Appl. No.: 583,243

[22] Filed: Feb. 22, 1984

[51] Int. Cl.$^4$ .............................................. F04B 9/00
[52] U.S. Cl. ................................... 417/319; 417/362; 192/84 C; 474/8
[58] Field of Search ............... 417/15, 42, 212, 223, 417/319, 362; 474/11, 8, 18, 28; 192/84 C; 123/198 C

[56] References Cited

U.S. PATENT DOCUMENTS

| | | | |
|---|---|---|---|
| 2,173,661 | 9/1939 | Perrine | 417/362 |
| 2,317,135 | 4/1943 | Crittenden et al. | 417/15 |
| 2,350,913 | 6/1944 | Mercer | 417/212 X |
| 2,448,379 | 8/1948 | Mantle | 417/15 |
| 2,866,528 | 12/1958 | Jacobs | 417/223 X |
| 2,877,528 | 3/1959 | Long | 474/28 |
| 2,934,022 | 4/1960 | Rodick et al. | 417/362 |
| 3,211,365 | 10/1965 | Phelps | 417/319 |
| 3,220,211 | 11/1965 | Nordquest | 417/319 X |
| 3,269,200 | 8/1966 | Vaughn et al. | 192/84 C X |
| 3,283,603 | 11/1966 | Kuiper | 474/11 X |
| 3,449,924 | 6/1969 | Sudmeier | 417/319 |
| 3,954,018 | 5/1976 | O'Berto | 474/11 |
| 4,174,641 | 11/1979 | Hillman | 474/18 X |
| 4,387,608 | 6/1983 | Mohl et al. | 474/18 X |
| 4,494,943 | 1/1985 | Takei et al. | 474/28 |

FOREIGN PATENT DOCUMENTS

| | | | |
|---|---|---|---|
| 1956767 | 5/1971 | Fed. Rep. of Germany | 417/362 |
| 2141103 | 1/1973 | France | 417/319 |
| 39985 | 3/1984 | Japan | 417/15 |

*Primary Examiner*—William L. Freeh
*Assistant Examiner*—Paul F. Neils
*Attorney, Agent, or Firm*—Michael J. Striker

[57] ABSTRACT

A compressor drive is suggested which in particular finds use as an air conditioning compressor for motor vehicles with the combustion motor being the drive unit. Thereby, the drive of compressor 10 is performed by means of a controllable V-belt variable drive 21 which can be separated from the compressor 10 by means of an electromagnetic clutch 12. Due to the known friction drive a rotational speed independency from the combustion motor can be attained for an air conditioning compressor. This is of a considerable advantage for the capacity of compressor 10.

3 Claims, 2 Drawing Figures

COMPRESSOR DRIVE FOR AUTOMOBILE AIR CONDITIONING COMPRESSOR HAVING V-BELT VARIABLE DRIVE

BACKGROUND OF THE INVENTION

The invention relates to a compressor drive, in particular for air condition compressors for motor vehicles with the combustion motor as the drive unit.

The core of an air conditioning unit is the air condition compressor which generally is driven by the combustion motor by means of a V-belt drive in motor vehicles. However, the rotational speed range of a combustion motor is subjected to strong fluctuations, so that the air conditioning compressor also operates with strong rotational speed changes. Moreover, the rotational speed of the motor very often does not correspond to the rotational speed on the compressor which would be required to meet the air conditioning requirement. An optimum mode of operation of the air conditioning unit is obtained when the compressor is driven with a substantially constant rotational speed.

The known air conditioning units are disadvantageous in that no rotational speed control of the compressor is provided. Thus, the air conditioning unit operates with large fluctuations and therefore also uneconomical and unsatisfactory.

This problem is transferred to other units which are driven by the combustion motor, in particular compressors.

SUMMARY OF THE INVENTION

It is an object of the invention to provide a compressor drive which operates with a substantially constant rotational speed independent from the rotational speed of the combustion motor or whose rotational speed and the air conditioning capacity is controllable.

This object is attained by means of a stepless controllable V-belt variable gear connected with the compressor, wherein the V-belt variable drive is controllable in such a manner that the rotational speed and therefore the air conditioning capacity of the compressor is adjustable.

Control drives on the basis of V-belt variable drives or pull means-friction drives, belt control drives or wide V-belt-adjustable drives are known. Generally, they consist of two belt disks of changeable width over which a V-belt is guided. Depending on the axial arrangement of the belt one obtains different transmissions.

The device in accordance with the invention enables in an advantageous manner to obtain a drive, for example, of the air conditioning unit which is substantially independent from the rotational speed of the combustion motor. During a low start-up rotational speed of the combustion motor the drive belt disk which is connected with the motor is adjusted to a low width of the disk parts, so that the drive belt runs on the outer circumference of this disk and correspondingly on the inner circumference of the output belt disk (see position in the drawing). In this belt position the compressor runs with a desired higher rotational speed despite the low rotational speed of the motor. During increasing rotational speed of the combustion motor the width of the drive disks is continuously adjusted in such a manner that the belt on the output belt disk migrates to the outside, so that the rotational speed of the compressor remains constant. An electronically controlled set member or a centrifugal flyball device adjusts the drive belt disk.

Due to the advantageous further embodiment of subclaim 2 it is possible that the rotational speed of the compressor is substantially independent from the rotational speed of the drive motor and can be controlled by means of a set member. Advantageously, a hydraulic or pneumatic cylinder or a membrane cylinder are used as the member adjustment.

The control, for example, by means of a flat pneumatic cylinder on the drive side of the inventive V-belt variable drive has, among others, the following advantages: The complete compressor drive in the case of failure operates in such a manner, i.e., if the compressed air for controlling the drive belt disk fails, that the pressure spring, which is installed on the output side, pushes the drive belt disk halves away from each other, so that the V-belt runs on a small diameter. The compressor runs with the fluctuating rotational speed of the drive motor, but from the safety technical point of view this is no problem.

In accordance with a further subclaim, an electromagnetic clutch is provided between the compressor and the V-belt variable drive. During each switch on performance of this electromagnetic clutch a short lived higher start-up moment is required. Thus, the V-belt on the drive side during the switch on performance has the desire to run on a smaller diameter, since a higher torque is required for acceleration. This desired effect is made possible in that the compressed air in the control cylinder for the drive disks can be relatively easily compressed, thus opening the control disk. Thereby, a considerable damping effect is obtained which decisively effects the life span of the unit.

In furtherance, the invention provides that the adjustment of the cone pulley halves is performed by means of a set motor. Here, you do not have the aforementioned damping effect, however with a set motor the adjustment of the set motor and thereby the rotational speed change of the V-belt variable drive can be adjusted by means of an electric signal.

Furthermore, there is also the possibility to adjust by means of a stroke magnet, whose control is performed accordingly.

Due to the electromagnetic clutch between the air conditioning compressor and the friction drive an air conditioning compressor can be separated at any time from the combustion motor, for example. Thereby, a particular narrow and compact structural mode of the total unit consisting of a compressor, clutch and friction drive is made possible. This is of particular importance, since generally the space conditions in the motor chamber of motor vehicles are very narrow. The friction drive together with the electromagnetic clutch are mounted directly on the connecting flange of the compressor.

DETAILED DESCRIPTION OF THE PREFERRED EMBODIMENT

Figure 1A:
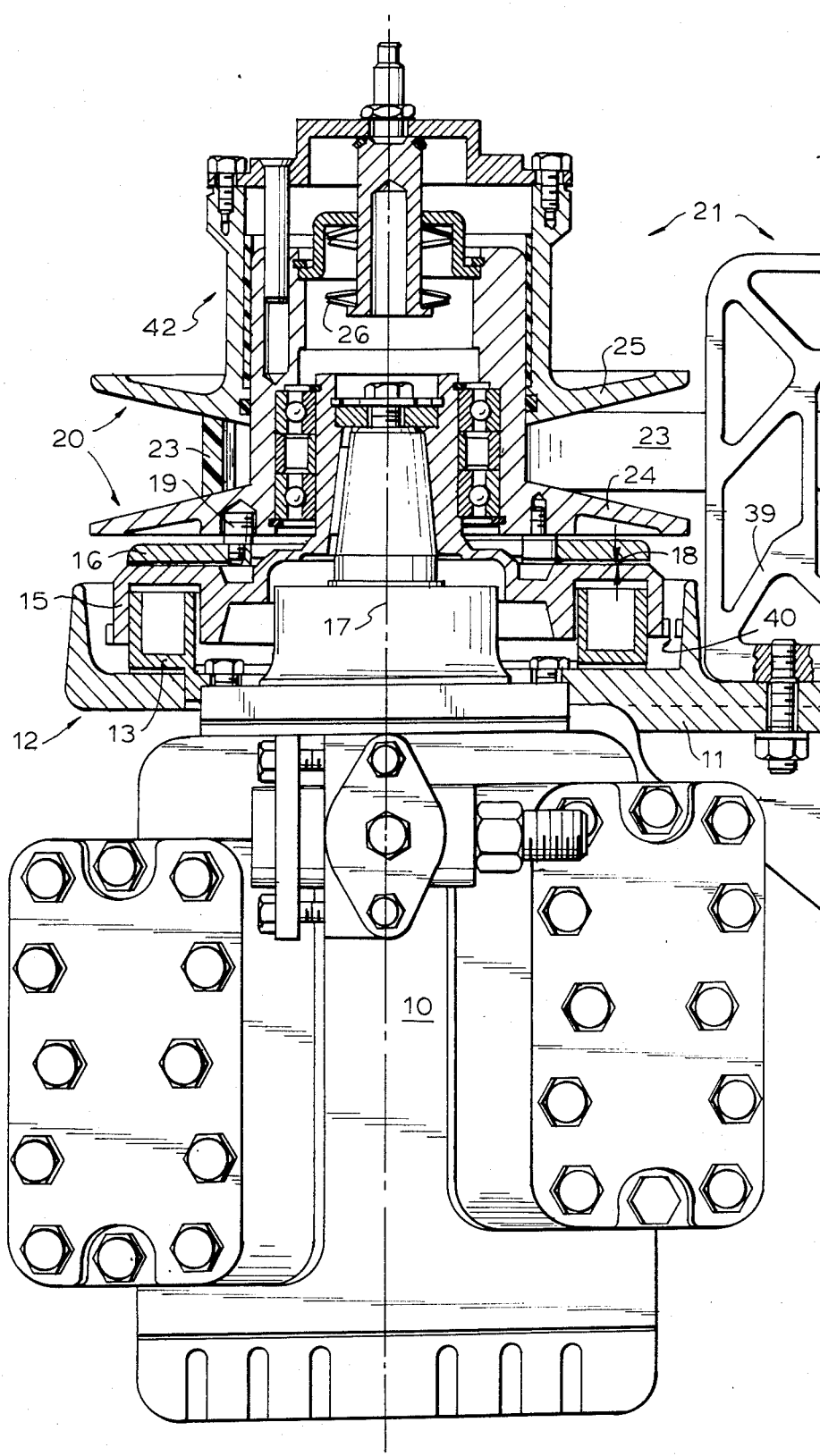
FIGS. 1A and 1B show a sectional view through an inventive compressor drive.
Figure 1B:
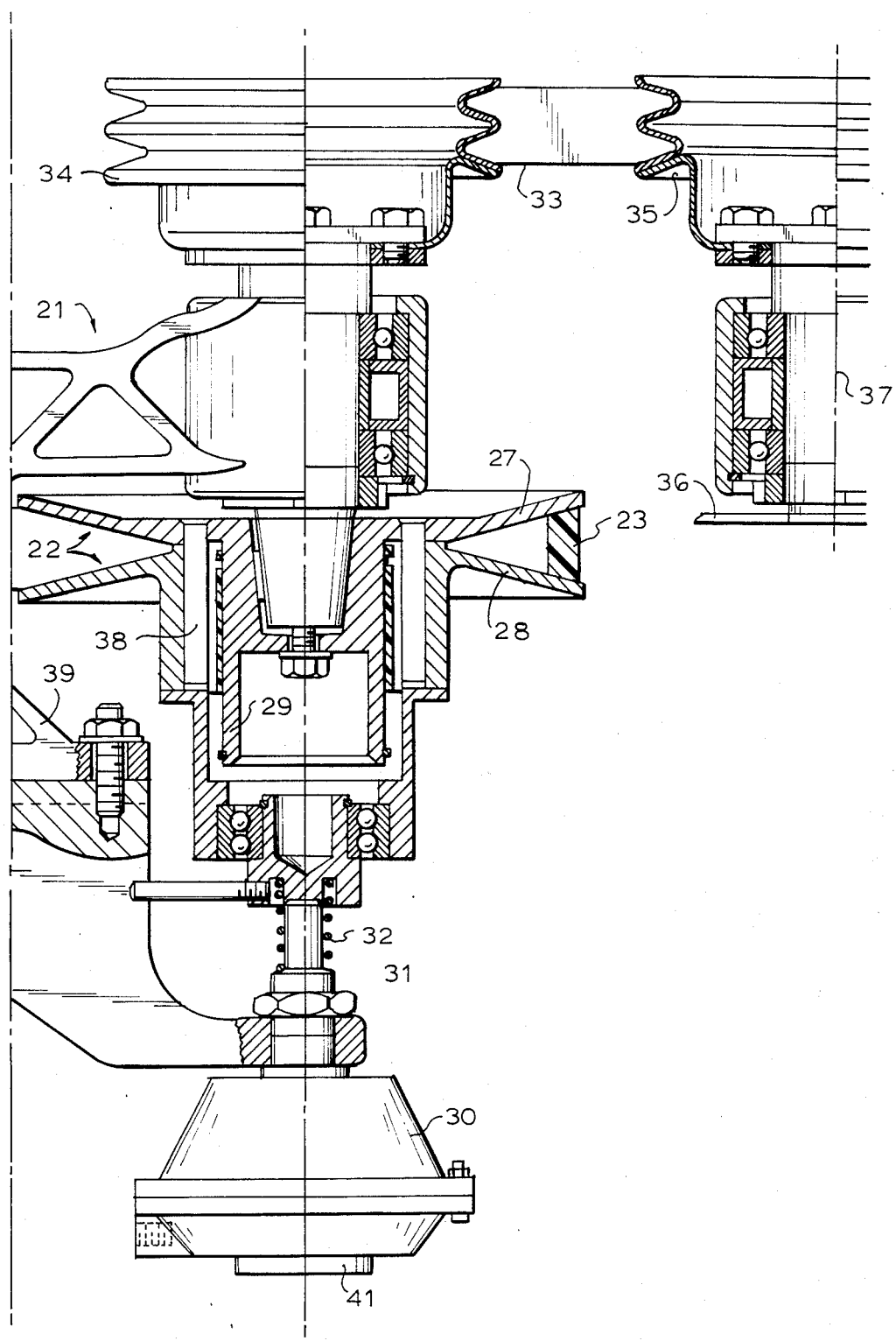

A support frame 11 is screwed on the air conditioning compressor 10 which relieves the remaining structural parts of the air conditioning compressor drive. A known electromagnetic clutch 12 is mounted directly on the drive shaft of the air conditioning compressor 10. The clutch consists of a stationary stator 13 in which an exciter coil 14 is imbedded. A rotor 15 and an anchor ring 16 are mounted independently from each other rotatably around an axis 17. In addition, the anchor ring 16 is axially moveable by a small amount, so that it closes an air slot 18 of about 0.3 mm when the exciter coil 14 is switched on and immediately engages on rotor 15. This rotor is rigidly connected with the drive shaft of the air conditioning compressor. The anchor ring 16 is connected with the output belt drive 20 of a V-belt variable drive 21 by means of a screw connection 19.

An extremely compact mode of structure is obtained in that the structural parts of the electromagnetic clutch 12 and the friction drive 21 are mounted on a common support frame 11 with an additional U-shaped support arm 39 made of aluminum die casting for receiving the drive belt disk 22. There is also a low bearing stress of the crankshaft of the air conditioning compressor. The drive is characterized by an extremely low weight.

The V-belt variable drive 21 consists of two belt disks 20,22 with changeable widths which are connected with each other by means of a wide V-belt 23. The belt disk 20 is directly flanged on the air conditioning compressor, while the mounting of the belt disk 22 is performed by the frame 11 with support arm 39.

The output disk 20 consists of a stationary disk half 24 and a displaceable disk half 25. The displacement of the disk halves 24,25 of the output belt disk 20 away from each other is performed against the force of a pressure spring 26, i.e., the pressure spring 26 pushes the disk halves 24,25 together.

The drive belt disk 22 also consists of a stationary disk half 27 and a displaceable disk half 28. This disk half 28 runs along a stationary guide cylinder or a boss 29 which is connected with the stationary disk half 27 which is formed by itself.

The pressure spring 32 pushes the disk halves 27,28 together, i.e., it acts against the pressure spring 26 in the output drive disk 20. Cam bolts 38 connect the two disk halves 27,28 twist proof with respect to each other.

The displacement is performed through a pressure medium admittance in the pressure chamber of the adjustment member 30 which is formed as a membrane cylinder. A hydraulic or pneumatic medium may be used as a pressure medium. The displacement of the disk half 28 against the stationary disk half 27 (admittance of the pressure chamber with pressure medium) is performed against the force of pressure spring 26 of the output disk 20 which pushes the disk halves 24,25 together or pushes the disk halves 27,28 away from each other. Due to these measures the drive V-belt 23 runs at a lower rotational speed in a pressure less system always in the innermost position of the drive belt disk 22. As is understood this is a safety measure.

The flat pneumatic cylinder or membrane cylinder 30 of conventional construction is provided with a mushroom like plunger on its inside which is displaced by means of a membrane by pressure admittance in axial direction. The pressure required for the displacement of the disk halves fluctuates between 0.2 and 6 bars.

The drive belt disk 22 is connected with a belt disk 34 for the drive of drive 21 with the combustion motor drive 35 to 37 by means of an axis which is mounted on the U-shaped support arm 39.

The belt 33 for driving the V-belt variable drive 21 is connected with a further belt disk 35 which is mounted on axis 37 of the combustion motor 36.

A transmitter 40 for picking up the rotational speed of compressor 10 is mounted in the range of the electromagnetic clutch 12 and controls the adjustment member 30 by means of an electronic control of a suitable conventional construction 41. Alternatively, a centrifugal force control, an electric adjustment motor or a stroke magnet may be used.

The device in accordance with the invention operates as follows:

For example, in order to attain a substantially constant rotational speed on the drive shaft of the air conditioning compressor 10 and thereby to attain a constant air conditioning capacity, the rotational speed of the compressor 10 is picked up by means of a transmitter 40 and is fed to an electronic control 41 which performs an actual-nominal value comparison and actuates the adjustment member 30 in case of deviations, i.e., performs a pressure admittance. Thereby, the disk halves 27,28 are pushed together. Therefore, the change of the rotational motor speed effects at first a rotational speed change of compressor 10 which is immediately corrected by the control of the adjustment member 30. Therefore, the V-belt variable drive 21 controls the different rotational speeds of the combustion motor 36. During a low rotational speed of motor 36 the disk halves 27,28 of the drive belt disk 22 are pushed together by pressure admittance in the pneumatic cylinder, so that the V-belt 23 migrates to the outside of the belt disk (see position in the drawing). This outward migration is performed against the pressure of pressure spring 26 of the output belt disk 20, whereby the width between the disk halves 24,25 is enlarged and the belt 23 runs inwardly of disk 20. Due to this measure, the rotational speed on the drive shaft of the air conditioning compressor 10 is increased.

During a high rotational speed of motor 36, the V-belt 23 runs in the inner range of the drive belt disk 22 and on the outer range of the output disk 20. In this case the rotational speed is lower than the one of the combustion motor 36, so that the air conditioning compressor can be operated with a lower rotational speed than the rotational speed of the combustion motor.

The electronic control 41 also permits the adjustment of any given constant compressor rotational speed in a simple manner and thereby any given air conditioning capacities independent from the rotational speed of the motor.

An essential point of the invention resides in the selection of the dimensions of the V-belt variable drive 21 in conjunction with the compressor, so as to attain an extreme compact and therefore light mode of structure, as well as to facilitate the assembly. For this purpose, the drive and output belt disks have a diameter of about 240 mm and an axial distance of about 330 mm. The rated speed of the compressor of $n_k \sim 2400$ 1/min. is attained with a transmission ratio of i=1:2 and with a rotational motor speed of $n_m \sim 1200$ 1/min. With higher rotational motor speeds the compressor rotational speed remains constant.

The small dimensions also permit a very easy assembly or disassembly of the V-belt 23 of drive 21, in that the same can be pulled off from the output drive belt disk 20 by the adjustment mechanism 42 when the drive belt disk 22 is fully opened.

I claim:

1. In a compressor drive for air conditioning compressors of motor vehicles having a combustion motor for driving a compressor having a drive shaft, wherein a drive of the compressor is performed by means of a controllable V-belt variable gear connected to the compressor and wherein an air conditioning capacity of the compressor is independent from a rotational speed of said combustion motor, the improvement comprising said variable gear including an output belt disk (20); an electromagnetic clutch (12) including a rotor (15) immediately and rigidly connected to the drive shaft of the compressor and an anchor ring (16) connected to said output belt disk whereby said variable gear with said compressor and said electromagnetic clutch, interconnected between said variable gear and said compressor, form a single structural unit, said variable gear further including a drive belt disk (22) operatively connected to said combustion motor and connected to said output belt disk by a belt; and a U-shaped support (39) and a supporting frame, said drive belt disk being supported in said support which is connected to said frame, said frame receiving the compressor.

2. The compressor drive as defined in claim 1, wherein said support is made of aluminum die cast.

3. The compressor drive as defined in claim 1, wherein a geometric arrangement and dimensions of said drive belt disk and said output belt disk are selected so that said belt is mountable and dismountable when said drive belt disk is fully open by said output belt disk and an adjustment mechanism on said output belt disk.

* * * * *